UNITED STATES PATENT OFFICE.

HENRY B. ALEXANDER, OF LOS ANGELES, CALIFORNIA, ASSIGNOR OF ONE-HALF TO W. H. ESDOHR, OF LOS ANGELES, CALIFORNIA.

PROCESS OF MAKING GERM AND BRAN BREAD.

1,148,815.  Specification of Letters Patent.  Patented Aug. 3, 1915.

No Drawing.   Application filed November 9, 1914.  Serial No. 871,210.

*To all whom it may concern:*

Be it known that I, HENRY B. ALEXANDER, a citizen of the United States, residing at Los Angeles, in the county of Los Angeles and State of California, have invented a new and useful Process of Making Germ and Bran Bread, of which the following is a specification.

My invention relates to the art of baking, and the principal object of the invention is to produce a loaf of bread which will have superior characteristics to those that have heretofore been produced, and which will be made up of ingredients and by a process which has not been previously employed for this purpose.

In the production of flour from wheat it is common practice to remove the outer covering, which forms what is generally known as bran, and to remove the germ, the flour proper being formed of the starch and gluten of the endosperm. The bran is of considerable value and various breads, especially that known as Graham, contain a certain percentage of bran. The germ of wheat is very nutritious, but contains a large proportion of fatty material and is extremely diastatic, so that bread having a large germ content is hard to prepare and has a decided tendency to decay, especially in hot weather.

A further object of my invention is to produce a loaf of bread which will have a high percentage of both bran and germ material and which will at the same time have excellent keeping qualities.

For the purpose of making my bread, I use a special flour having a high percentage of germ material, and I mix the bread according to the following formula: 120 pounds of special flour, 40 ounces of salt, 6 ounces of compressed yeast, 3 pounds of vinegar, 52 ounces of sugar, and a sufficient quantity of water to make the above up into a dough. It will be noted that the above formula differs from that employed in making up ordinary bread in the following particulars: (*a.*) It uses a special flour having a large percentage of bran and germ material. (*b.*) It uses more salt than is ordinarily employed by bakers in producing ordinary white bread. (*c.*) It uses about one-third the quantity of yeast commonly employed. (*d.*) It employs vinegar, which, so far as I am aware, is not employed by any baker in producing ordinary bread. (*e.*) It uses about twice as much sugar as is ordinarily employed in making bread. (*f.*) It uses no grease or shortening whatsoever.

The method of making the bread is as follows: The dough is mixed and allowed to stand for two hours. It is then broken down or kneaded and allowed to stand for twenty minutes. The mass of dough is then divided into loaves, placed in pans, and allowed to stand in the pans twenty-five minutes. It is then placed in a very hot oven and baked for forty minutes. The result of the above formula and process is a loaf of bread which is very wholesome, which is fairly light, and free from the toughness found in the average whole wheat bread, which has remarkable keeping qualities, and which is very palatable.

I have found that bread made by my formula and process is both palatable and healthful and such bread already has a large local sale. I have found that all the ingredients except perhaps the sugar are essential and that the particular process described gives excellent results. I am not positive as to the reasons for this, but I believe that by using a small amount of yeast, and by further checking this yeast by an excess of salt, and the acetic acid of the vinegar, that I delay the fermentation so that very active and rich flour may be used. I believe the bran is healthful largely on account of its action in the intestines. I have further found that a high heat oven is essential to the proper baking of my bread.

I claim as my invention:—

The process of making bread consisting of mixing a flour having a large percentage of germ material with a small amount of yeast, checking the action of said yeast with salt and vinegar, and baking at a high heat.

In testimony whereof, I have hereunto set my hand at Los Angeles, California, this 3rd day of November, 1914.

HENRY B. ALEXANDER.

In presence of—
 FRED A. MANSFIELD,
 FORD W. HARRIS.